W. B. YATES.
GEAR CUTTING MACHINE.
APPLICATION FILED MAY 18, 1906.

912,349.

Patented Feb. 16, 1909.
4 SHEETS—SHEET 1.

WITNESSES:

INVENTOR
William B Yates

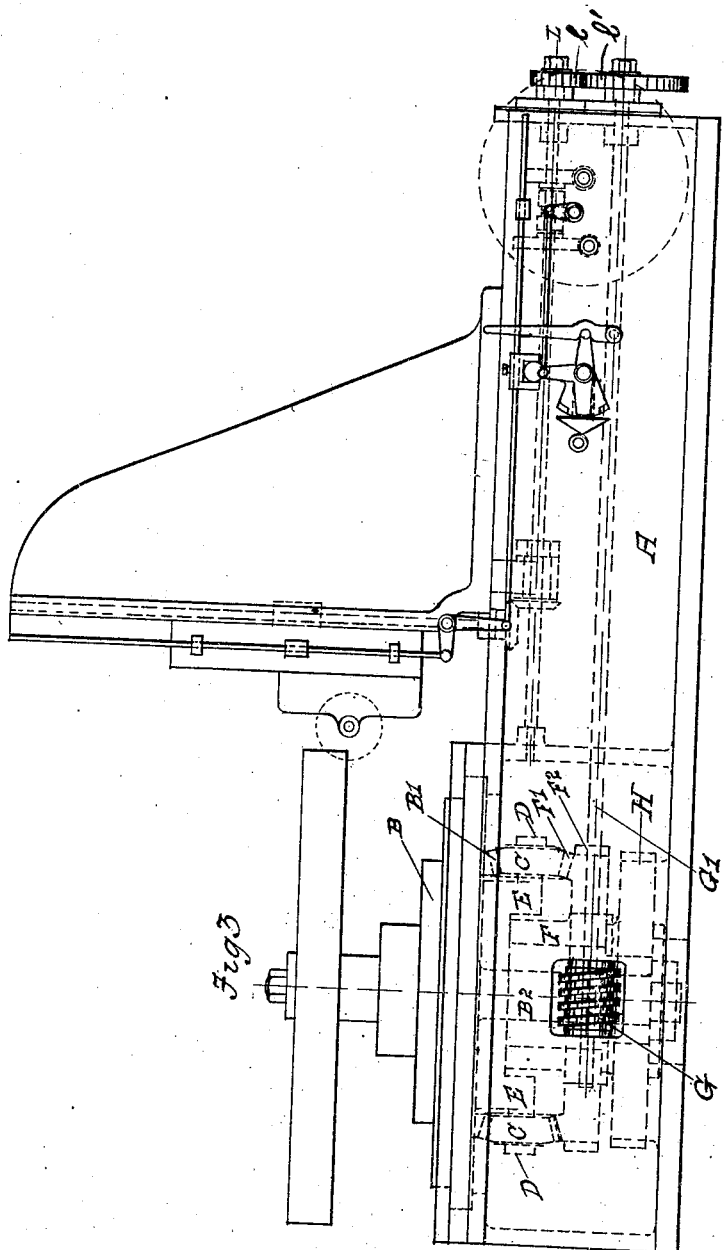

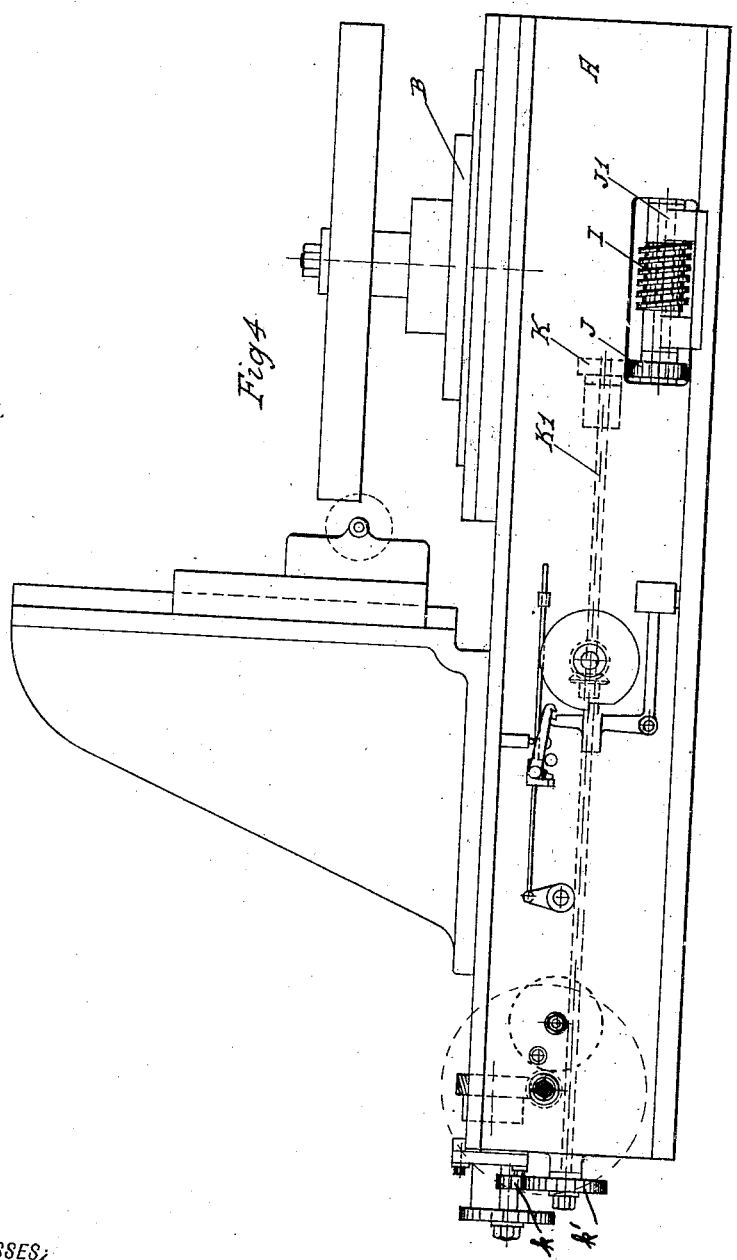

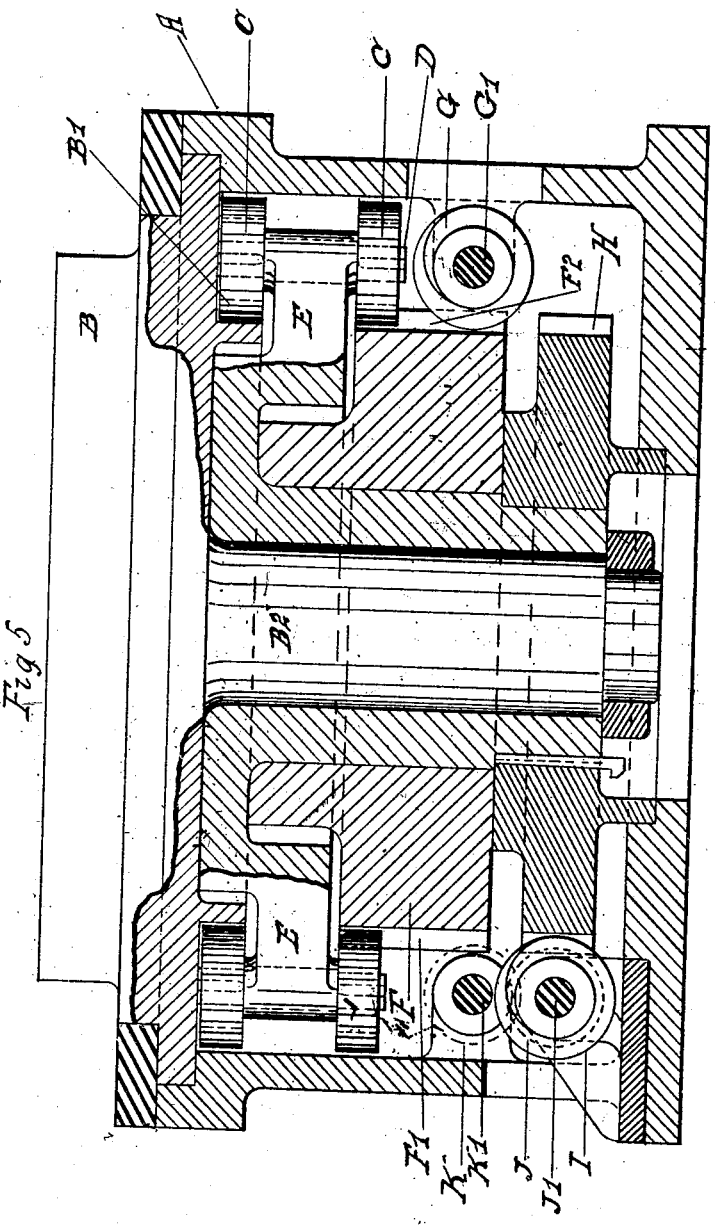

UNITED STATES PATENT OFFICE.

WILLIAM B. YATES, OF CHICAGO, ILLINOIS.

GEAR-CUTTING MACHINE.

No. 912,349.

Specification of Letters Patent.

Patented Feb. 16, 1909.

Application filed May 18, 1906. Serial No. 317,506.

*To all whom it may concern:*

Be it known that I, WILLIAM B. YATES, a citizen of the United States, residing at 6458 Eggleston avenue, Chicago, in the county of Cook and State of Illinois, have invented certain new and useful Improvements in Gear-Cutting Machines, of which the following is a specification.

The object of this invention is an improved device for giving independent rotary motion to a gear blank to be cut, the same being securely supported and carried by the work chucking table or work arbor, when being operated on cutting spirally, thereby retaining intact the indexing mechanism, for indexing (also known as dividing) and the device the subject of this application for giving a separate rotary motion, known in the art as spiral lead, further allowing a strong and substantial construction of parts, largely eliminating thereby defects known as backlash and thus providing a machine capable of producing an increased output.

In the description of this device like letters refer to like parts in the several views which consist of—

Figure 1:
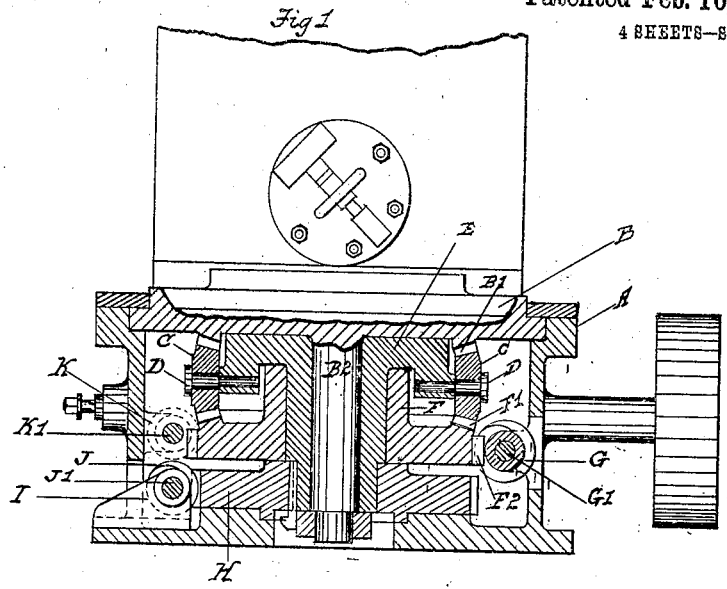
Figure 2:
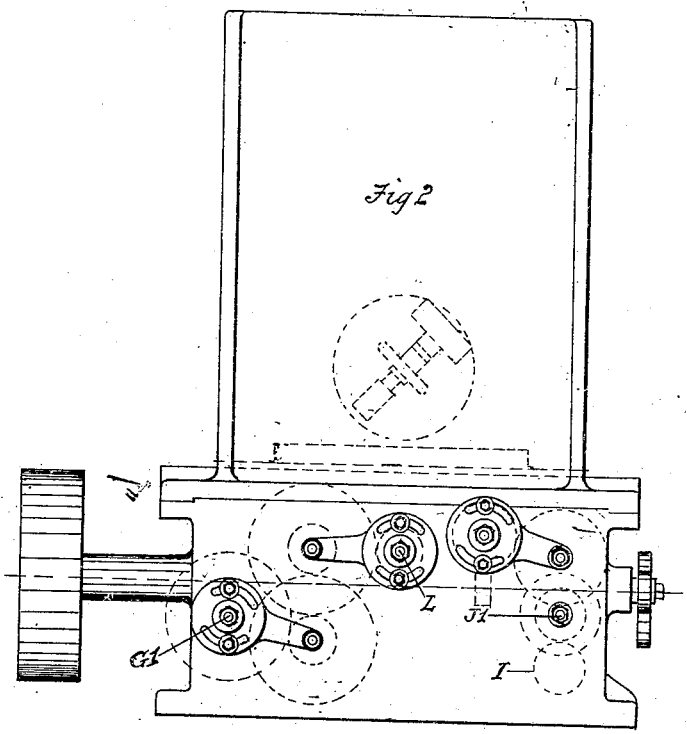

Figure 1 Sheet 1 a cross section of this device. Fig. 2 Sheet 1 an end view of the base showing change gear arrangements. Fig. 3 Sheet 2 a longitudinal elevation of the pulley side of the machine. Fig. 4 Sheet 3 a longitudinal elevation of the opposite side of the machine and the Fig. 5 Sheet 4 a modification of the parts using spur and spiral gears instead of bevel and spiral gears, this modification in no way vitiating the essence of the invention.

Figs. 2, 3, and 4 show also connections such as change gear arrangements, indexing stop mechanism, cutter carriage, cutter carriage feed and return arrangements etc., all component parts of a gear cutting machine and in which this invention has no claim in the separate and varied characteristics of these devices known to the art and many subject of expired patents, further than in the combination with my invention for a perfected running machine, therefore no special reference is made to them by letter or number as the essence of this invention lies not in the details of any of the many arrangements, but in those parts of a gear cutting machine illustrated, described and claimed.
Referring to Fig. 1 Sheet 1 A is the base of the machine B is the work chucking table having on its under surface gear teeth $B^1$, these teeth mesh with the intermediate transmission gears C C which are supported and revolve on the trunnions D D attached to the indexing sleeve E. Meshing with these pinions C C is a gear $F^1$ which is a part of the lead controlling sleeve F on the periphery of which is a worm gear $F^2$, G being the worm keyed on the gear shaft $G^1$ giving vibratory rotary, or continuous rotary motion to F in either direction.

Keyed to E is the indexing worm gear H which receives motion from the worm I; this worm is supported in an independent bearing in order that it may be disengaged from H when so desired. Keyed on the worm spindle $J^1$ to which the worm I is keyed is a tooth pinion J which is rotated by and in mesh with pinion K secured to change gear shaft $K^1$.

Change gear shaft $G^1$ receives its motion from shaft L whose speed is controlled relatively with that of the feed of the cutter carriage and of its return and the speed of the shaft $G^1$ in relation to that of shaft L is determined by suitable change gearing on and between these two shafts according to the spiral lead required, such as shown at $l, l^1$.

Change gear shaft $K^1$ receives its motion from the pulley shaft through suitable combinations of gearing and mechanisms common in such machines, such as shown at $k, k^1$.

In giving requisite motion to the shafts $G^1$ and $K^1$, I do not limit myself to any particular forms of mechanism as many such are in daily use and are common property.

The operation of my machine is as follows: A gear blank is firmly secured to the chucking table and the proper change gears for indexing the number of teeth to be cut, also the change gears and mechanisms to give the desired lead of spiral, determined and placed respectively. The machine being given motion it is obvious the indexing worm I holds firmly from moving, or controls in movement the index gear H keyed to E, when in operation, as for instance at the moment of indexing. Shaft $G^1$ is rotating giving motion to F by the worm G engaged in the worm wheel $F^2$ also imparting through $F^1$ (F, $F^1$ and $F^2$ being one composite member) motion to gears C C rotating them on their respective studs D D which are a part of the indexing sleeve E controlled and held firmly in position by the indexing worm I. These pinions C C are also in mesh with the gear wheel $B^1$ secured to the under side of the chucking table B and thus impart to it the lead motion given to them by the gear F¹. Indexing and lead can be in operation at the same time, the gears C C simply moving a determined number of degrees due to the amount of index motion given. It is further seen a continuous motion when using a hob cutter can be given by either or both shafts G¹ and K¹. They may be used together in augmenting or decreasing motion. Motion is given to the cutter and cutter carriage, and the angularity of the cutter provided for by any of the many arrangements now in use.

Having described the nature and purpose of my invention what I claim as new and desire secured to me by the Letters Patent is—

1. A gear cutting machine comprising a rotatable arbor having a chucking table thereon, indexing and lead-controlling sleeves concentrically mounted thereon, an intermediate gear journaled upon one sleeve and engaging said table and said other sleeve respectively, and means for simultaneously and independently rotating said sleeves.

2. A gear cutting machine comprising a chucking table rotatably supported in a suitable housing and provided with gear teeth, a pair of rotatable sleeves concentric with said table and connected with said gear teeth through intermediate gearing, means for connecting one of said sleeves with an indexing shaft and means for connecting the other sleeve with a change-gear shaft.

3. A gear cutting machine comprising a rotatable arbor, a chucking table carried thereby and having gear teeth thereon, an indexing sleeve journaled on said arbor carrying a pinion in mesh with said gear, a lead-controlling sleeve journaled on said indexing sleeve and having gear teeth in mesh with said pinion, and means arranged to rotate said sleeves independently in either direction.

4. A gear cutting machine comprising a rotatable arbor, a chucking table carried thereby and having gear teeth thereon, an indexing sleeve journaled on said arbor carrying a pinion in mesh with said gear, a lead-controlling sleeve journaled on said indexing sleeve and having gear teeth in mesh with said pinion, worm gears on each of said sleeves and separate worms in mesh with said worm gears.

5. A gear cutting machine comprising a rotatable arbor, a chucking table carried thereby and having gear teeth thereon, an indexing sleeve journaled on said arbor carrying a pinion in mesh with said gear, a lead-controlling sleeve journaled on said indexing sleeve and having gear teeth in mesh with said pinion, a gear on said indexing sleeve, a worm in mesh with said gear and connected with an indexing device, and means for connecting said lead-controlling sleeve with a change-gear shaft.

In testimony whereof I have affixed my signature, in presence of two witnesses.

WILLIAM B. YATES.

Witnesses:
R. W. YATES,
R. V. BANE.